Jan. 30, 1962 E. F. WEGENER ET AL 3,019,033
TOWING DEVICES
Filed Sept. 30, 1959 2 Sheets-Sheet 1
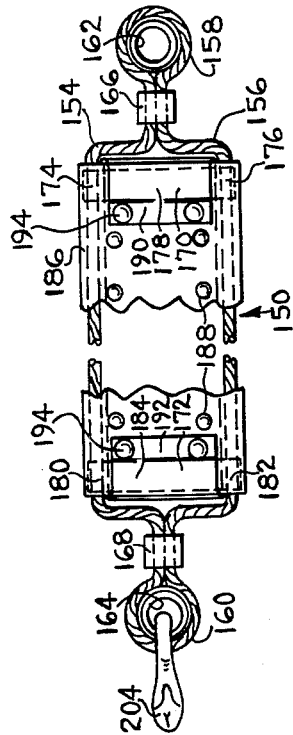
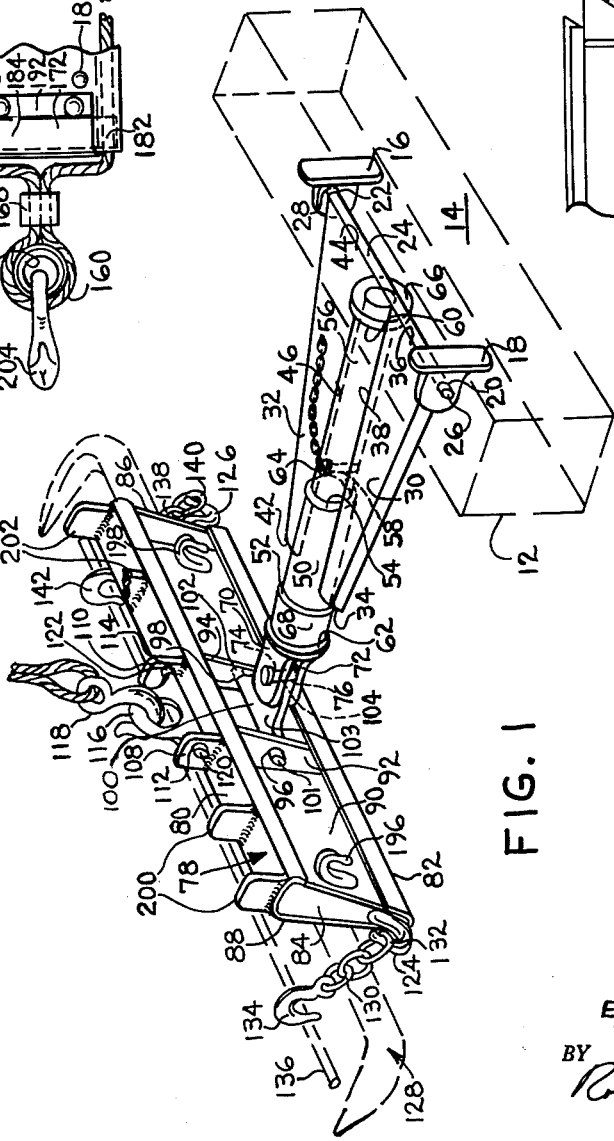
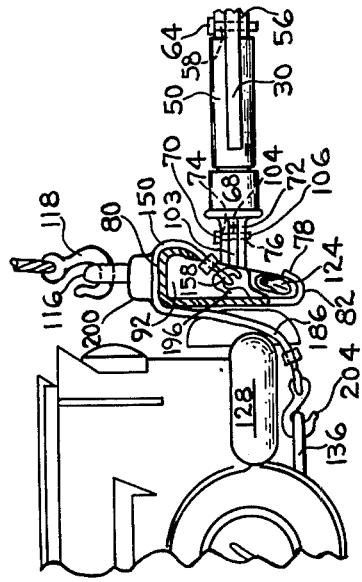
INVENTORS
EDWARD F. WEGENER
THURE H. WEGENER
BY Robert A. Green
ATTORNEY Jan. 30, 1962   E. F. WEGENER ET AL   3,019,033
TOWING DEVICES
Filed Sept. 30, 1959   2 Sheets-Sheet 2
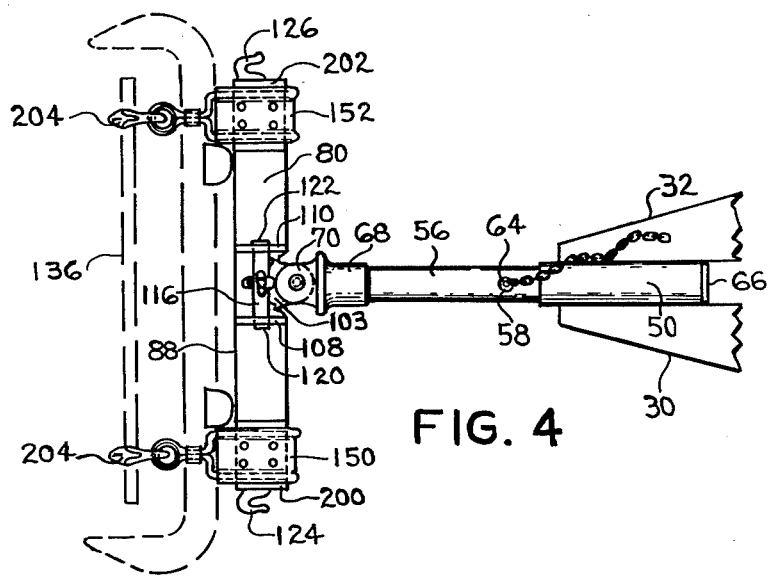
FIG. 4
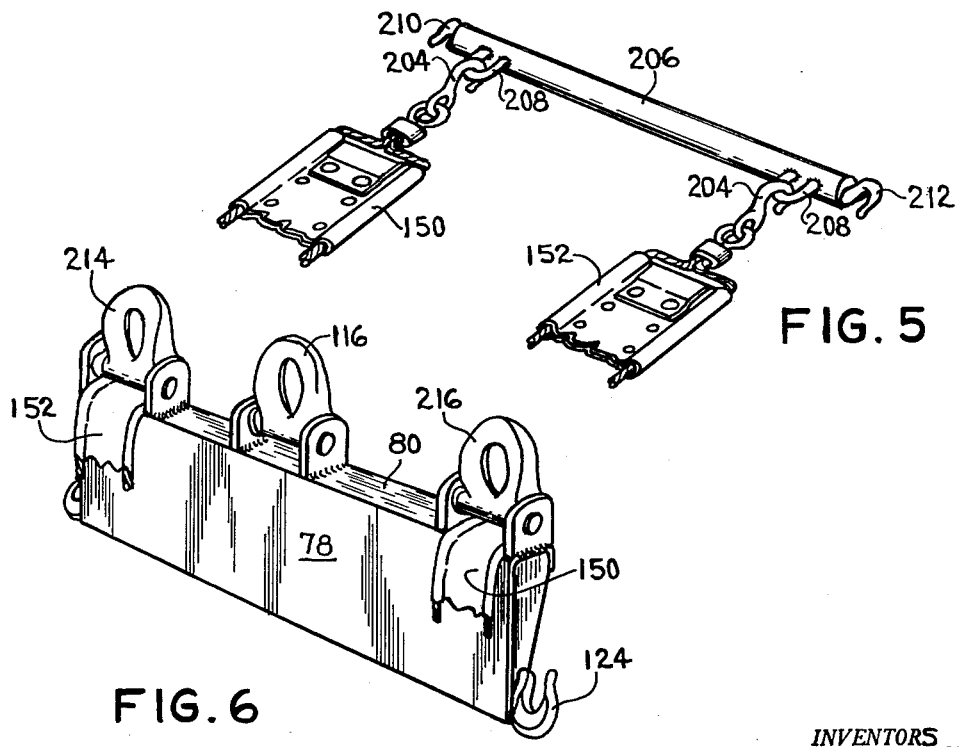
FIG. 5
FIG. 6
INVENTORS
EDWARD F. WEGENER
THURE H. WEGENER
BY Robert A. Green
ATTORNEY

United States Patent Office 3,019,033
Patented Jan. 30, 1962

3,019,033
TOWING DEVICES
Edward F. Wegener and Thure H. Wegener, both of Matawan Road, Laurence Harbor, N.J.
Filed Sept. 30, 1959, Ser. No. 843,459
7 Claims. (Cl. 280—482)

This invention relates to vehicle towing devices known as tow bars, and particularly to tow bars adapted to be mounted on a vehicle for towing damaged or disabled vehicles.

At the present time, there are two types of tow bars available, one which is particularly suitable for towing wrecks which have front ends which are damaged and need not be protected during towing, and one which is particularly suitable for towing wrecks which have undamaged front ends. Thus, operators of towing vehicles may buy one or both tow bars, but a single tow bar which is completely satisfactory for all types of situations is not now available.

Accordingly, the principles and objects of the present invention are concerned with the provision of an improved tow bar suitable for universal application with all types of wrecks, the tow bar being characterized by its comparative simplicity in construction and operation.

Briefly, a tow bar embodying the invention includes a horizontal shaft adapted to be secured to a towing vehicle and rotatable about a horizontal axis. A pair of rigid ribs are secured to the shaft and are spaced apart to provide a space in which a first tube is positioned and secured to the ribs. A second tube is slidably mounted in the first and is provided with locking means by which it may be locked in several different positions with respect to the first tube. The length of the tow bar may thus be varied.

The leading end of the second tube is secured to a comparatively rugged lift plate from which connection may be made to the towed vehicle and by which one end of the towed vehicle is raised. Additionally, an improved sling is provided which may be connected between the lift plate and the towed vehicle and which provides sure connection to the towed vehicle without damaging any part of the towed vehicle. The tow bar is so constructed that it may be used readily and conveniently with all types of wrecked vehicles.

The invention is described in greater detail by reference to the drawing wherein:

FIG. 1 is a perspective view of a tow bar embodying the invention;

FIG. 2 is a plan view, partly in section, of a portion of the apparatus of the invention;

FIG. 3 is an elevational view of a portion of the apparatus of the invention and a vehicle to be towed;

FIG. 4 is a plan view of a portion of the aparatus of the invention and a vehicle to be towed;

FIG. 5 is a perspective view of a modification of a portion of the apparatus of the invention; and FIG. 6 is a perspective view of a modification of another portion of the apparatus of the invention.

Referring to the drawings, a tow bar 10 embodying the principles of the invention is preferably mounted on a flat vertical rear panel 12 of a tow truck represented schematically at 14. The rear panel 12 is provided with horizontally aligned bearing blocks 16 and 18 which are suitably spaced apart. The tow bar 10 includes a horizontal shaft or cross member 24 having ends 26 and 28 which are rotatably mounted in the bearing blocks. The horizontal shaft 24 is thus rotatable about a horizontal axis. The tow bar 10 further includes a pair of strong metallic ribs 30 and 32 which are shown to be generally trapezoidal in form but which may be in any other suitable form. The rib 30 includes front end 34, rear end 36, and a long side 38. The rib 32 includes front end 42, rear end 44, and side 46. The rib members are spaced apart with their sides 38 and 46 parallel to each other and with their rear ends 34 and 42 welded or otherwise secured to the horizontal shaft 24.

A first cylindrical hollow metallic tube 50 is secured to the rib members and is positioned between them. The tube includes an end 52 which substantially abuts the ends 36 and 44 of the ribs 30 and 32, and an end 54 which terminates at aproximately the longitudinal centers of the ribs 30 and 32. A second cylindrical hollow metal tube 56 is slidably and rotatably mounted within the first cylinder 50 and includes an aperture 58 between its ends 60 and 62 in which a locking pin 64 is adapted to be inserted to hold the inner tube at different positions with respect to the outer tube. The end 60 of the tube 56 includes a flange 66 which has a larger diameter than the end 54 of the fixed tube 50 so that the inner tube cannot be withdrawn from the outer tube. The dimensions of the inner and outer tubes 56 and 50 and the location of the aperture 58 are such that when the inner tube is disposed entirely within the outer tube and the tow bar is not extended, the aperture 58 is adjacent to the rear end 54 of the tube 50 and the locking pin 64 prevents the inner tube from being withdrawn. When the tow bar is lengthened by drawing the inner tube outwardly, the flange 66 abuts the rear end 54 of the tube 50 and the aperture 58 is adjacent to the front end 52 of the tube 50 and the bar is thus held locked in the extended position.

The inner tube 56 carries at its end 62 an enlarged cylindrical portion 68 which comprises a coupling bracket and which bears against the end 52 of the outer tube 50 when the inner tube is inserted to the limit of its travel in the outer tube. The cylindrical portion 68 is provided with a pair of spaced-apart plates 70 and 72 which are provided with aligned apertures 74 and 76.

The tow bar 10 further includes a horizontal lift plate 78 at its front end oriented substantially transversely to the tubes 50 and 56. The lift plate 78 is the portion of the tow bar 10 which comes into contact with the vehicle being towed. Thus, the lift plate is preferably generally rectangular in form and has a relatively large surface area which allows favorable engagement to be made with the vehicle being towed. Thus, since, in general, the lift plate contacts the front or rear bumper of a vehicle, it should contact a favorable length of such a bumper and it should be about as wide or somewhat wider than the bumper, as shown in FIG. 3. The plate 78 has a wide top edge 80, a narrower bottom edge 82, and side plates 84 and 86. The lift plate includes an outer surface 88 and an inner surface 90. On the inner surface 90 of the lift plate 78 and at about its center are secured a pair of ribs 92 and 94 which are spaced apart symmetrically on opposite sides of the center of the inner surface 90. The ribs 92 and 94 are parallel to each other and are transverse to the long axis of the lift plate and are provided with aligned apertures 96 and 98. The apertures 96 and 98 are positioned at approximately the centers of the ribs 92 and 94. A securing plate 100 is provided including a shaft-like portion with ends 101 and 102 rotatably inserted in the apertures 96 and 98 in the ribs 92 and 94 and, in addition, including a projecting tongue 103 which is provided with an aperture 104. The tongue 103 is positioned between the plates 70 and 72 of the cylinder 68 so that the apertures 104, 74, and 76 are aligned and a suitable locking pin 106 is inserted in the apertures and locked therein so that the inner tube 56 is thus secured to the lift plate 78. The locking pin 106 represents the center about which the parts can rotate with respect to each other. With cylinders 50 and 56 secured to substantially the center of the lift plate through cylinder 68 and plate 100 as described above, towing forces are applied to the lift plate at approximately its geometric center. Thus, there is no tendency to rotate or skew the lift plate with respect to the portion of the vehicle with which it is in contact.

On the top edge 80 of lift plate 78 are provided a pair of brackets 108 and 110 spaced apart and having horizontally aligned apertures 112 and 114. An eye member 116 adapted to be grasped by a lifting hook 118 is secured to the brackets 108 and 110 by projecting ears 120 and 122 which are rotatably inserted in the apertures 112 and 114 in the brackets 108 and 110. The hook 118 is secured to a suitable boom, not shown, mounted on the towing vehicle 14.

A pair of hooks 124 and 126 are provided secured to the side plates 84 and 86 of the lifting plate 78. According to the invention, the axes of the hooks 124 and 126 are oriented at an acute angle with respect to the plane of the front surface 78 of the lifting member so that they face away from the towed vehicle and toward the towing vehicle. Thus, as seen in FIG. 3, the hooks are oriented so that they are turned slightly clockwise of the longitudinal axis of each of the side plates. With this orientation of the hooks 124 and 126, a chain secured thereto cannot accidentally become disengaged while a vehicle is being towed. The hooks 124 and 126 are used when a vehicle 128 is to be towed which has a damaged front end and unusual measures need not be taken to protect the damaged vehicle. For such a use, a chain 130 having an eye 132 at one end and a hook 134 at the other has the eye 132 secured to the hook 124 and the hook 134 secured to a rigid portion of the frame 136 of the damaged vehicle 128. A similar chain 138 has at one end an eye 140 secured to the hook 126 and at the other end a hook 142 secured to the frame portion 136. A lifting force applied to the lifting hook 118 raises the horizontal lift plate 78 by rotating the horizontal shaft 24 and the front end of the damaged vehicle is raised for towing. Since the hooks 124 and 126 slant away from the towed vehicle, it is virtually impossible for the chains 130 and 138 to be disengaged therefrom as could happen if the hooks were vertically oriented or if they were oriented toward the towed vehicle.

The tow bar of the invention also includes means for protecting a vehicle which has an undamaged front end which is to be protected while the vehicle is being towed. This means comprises a pair of flexible protective slings 150 and 152 which are adapted to be coupled to the vehicle being towed while providing protection therefor. The slings are identical and only one, 150, is shown in detail in FIG. 2. Each sling comprises two strands of wire cable 154 and 156 which are formed to provide eyes 158 and 160 at the ends with metal thimbles 162 and 164 held within the eyes to shape them. Sleeve ferrules 166 and 168 are provided securing the two portions of the wire cable together rearwardly of the eye portions 158 and 160 and riveted or otherwise secured to the cable members 154 and 156.

Rearwardly of the ferrules 166 and 168, spacers 170 and 172 are provided and the spacer 170 includes a pair of tubular members 174 and 176 spaced apart by a rigid rib member 178. The spacer 172 includes tubes 180 and 182 and rigid spacer rib 184. The wire cables 154 and 156 extend through the tubular portions 174, 176 and 180, 182 and are held spaced apart thereby.

A protective sheath 186 of canvas or the like is provided over the cables 154 and 156 and is of sufficient length so that its ends extend to the spacers 170 and 172. Rivets 188 or other fasteners are secured to the top and bottom layers of the sheath so that the sheath is held in position on the cables 154 and 156. In addition, brackets 190 and 192 are placed over the end of the sheath and suitable fasteners 194 are provided to secure the brackets to the sheath 186 and to the spacers 170 and 172, if desired. The sheath is thus prevented from slipping off the cables.

In order to secure the slings to the tow bar, the inner surface of the tow bar (FIG. 1) is provided with a pair of downwardly pointed hooks 196 and 198 spaced apart and positioned adjacent to the side plates 84 and 86 of lift plate 78. Two pair of guide plates or brackets 200 and 202 are mounted on the top edge 80 aligned with the hooks 196 and 198 for guiding the slings 150 and 152.

In using the slings, each eye 158 is secured to one of the hooks 196 and 198 and the eyes 160 are provided with hooks 204 which are secured to a suitable portion of the vehicle being towed. Alternatively, an auxiliary chain (not shown) may be coupled between the eyes 160 of the slings and the vehicle being towed. When the slings are connected in place (FIG. 3) and the vehicle is raised, the cover sheaths 186 on the slings protect the bumper and other portions from being scratched.

In a modification of the invention shown in FIG. 5, means are provided to maintain the slings 150 and 152 properly spaced apart when in use. This means comprises a metal pipe spacer bar 206 having two eyes 208 spaced apart an amount equal to the desired spacing between the slings when in use. The hooks 204 secured to the eyes 160 of the slings are coupled to the eyes 208. The ends of the spacer bar 206 are provided with hooks 210 and 212 and suitable chains (not shown) are coupled between the hooks 210 and 212 to the vehicle to be towed.

In another modification of the invention shown in FIG. 6, two additional eyes 214 and 216 similar to eye 116 are rotatably secured to the top edge 80 of the horizontal lift plate 78. Thus, means for securing several lifting hooks to the tow bar are provided. In order to use the slings 150 and 152 with this construction, the eyes 214 and 216 are spaced above the top edge 80 a distance sufficient to allow the slings to be inserted between them and the top edge of the lift plate.

The principles of the invention are clear from the foregoing discussion and variations in the specific constructional details will occur to those skilled in the art without departing from those principles. For example, shapes and sizes of many parts may be varied, and where parts are secured together, they may be bolted, welded, cast together, or otherwise suitably coupled.

The towing device of the invention described above has universal utility and incorporates in a single device, the operations previously performed most satisfactorily by two separate devices. Thus, the tow bar of the invention may be used to tow front end wrecks by the simple expedient of coupling short chains between it and the wreck. The construction described provides a tow bar which is easy to use, which provides optimum contact with a vehicle being towed and which holds securely to the towed vehicle during operation. In addition, by means of the improved slings described and the simple means of attachment thereof, the tow bar may be used to tow vehicles which have front ends which are intact and are to be protected. The chains and the slings may both be carried by the tow bar and one or the other may be used easily and quickly as required.

What is claimed is:

1. A towing device including a transverse rod adapted to be secured to a tow bar and rotatable about a horizontal axis, a pair of ribs secured to said rod and spaced apart from each other, a first hollow cylinder secured between said ribs, a second telescoping cylinder slidably and rotatably mounted in said first cylinder, means for locking said cylinders in different positions with respect to each other, an elongated plate secured to one end of said second cylinder and oriented transversely thereto, said plate including a top edge, front and rear surfaces, and a pair of side plates, said rear surface being generally flat and adapted to be placed in contact with a vehicle being towed, a first pair of hooks secured to said side plates for use in coupling to a vehicle to be towed, a second pair of hooks secured to the rear surface of said elongated plate for use in coupling to a vehicle to be towed, and a pair of flexible slings coupled at one end to said second pair of hooks and adapted to be coupled at the other end to a vehicle to be towed, each sling comprising a pair of spaced-apart cables having a protective sheath covering them, and guide plates on the top edge of said elongated plate for use in positioning said slings, the slings being adapted to lie between the guide plates.

2. A towing device including a first cylinder adapted to be secured to a tow truck and rotatable with respect thereto about a horizontal axis, a second cylinder coaxial with and telescoping with said first cylinder and slidable with respect thereto and having a free end remote from said first cylinder, means associated therewith for locking said cylinders in different positions with respect to each other, a coupling bracket mounted in the free end of said second cylinder, a large-area generally rectangular plate having a top edge and large-area inner and outer surfaces and adapted to have the greater portion of its outer surface bear against a portion of a vehicle to be towed, a pair of plates secured to the inner surface of said large-area plate and spaced apart on opposite sides of the center thereof, a securing plate having a portion rotatably secured to said pair of plates approximately midway between the long edges of said large-area plate and rotatable about a horizontal axis, said securing plate also being rotatably coupled to said coupling bracket whereby said large-area plate is free to rotate in several planes, and a pair of hooks spaced apart and secured to said large-area plate near the ends thereof, said hooks being adapted to be coupled to a portion of a vehicle to be towed.

3. The device defined in claim 2 wherein said large-area plate includes a pair of narrow side plates secured to the ends thereof and said hooks are secured to said side plates, said hooks being skewed so that each lies clockwise of the longitudinal axis of the side plate to which it is secured so that a chain attached thereto is prevented from slipping off when the large-area plate is manipulated during a lifting operation.

4. The device defined in claim 2 and including a pair of flexible, non-abrasive straps coupled at one end to said large-area plate and including means at the opposite end for attachment to a vehicle to be raised, said straps being thus adapted to come into contact with the body of the vehicle being lifted and providing a protective action therefor.

5. The towing device defined in claim 2 and including a second pair of hooks secured to said large-area plate, and a pair of flexible slings coupled at one end to said second pair of hooks and adapted to be coupled at the other end to a vehicle to be towed, each sling comprising a pair of spaced-apart cables having a protective sheath covering them.

6. The towing device defined in claim 2 and including a second pair of hooks secured to said large-area plate, a pair of flexible slings coupled at one end to said second pair of hooks and adapted to be coupled at the other end to a vehicle to be towed, each sling comprising a pair of spaced-apart cables having a protective sheath covering them, and a spacer bar secured to said other end of each sling and adapted to maintain the slings properly spaced apart.

7. The towing device defined in claim 2 and including a second pair of hooks secured to said large-area plate, a pair of flexible slings coupled at one end to said second pair of hooks and adapted to be coupled at the other end to a vehicle to be towed, each sling comprising a pair of spaced-apart cables having a protective sheath covering them, a spacer bar secured to said other end of each sling and adapted to maintain the slings properly spaced apart, and a pair of hooks on said spacer bar for use in coupling to a vehicle to be towed.

References Cited in the file of this patent

UNITED STATES PATENTS

| | | |
|---|---|---|
| 1,920,106 | Reichert | July 25, 1933 |
| 2,512,635 | Flowers | June 27, 1950 |
| 2,555,663 | Schouboe | June 5, 1951 |
| 2,712,877 | Wiley | July 12, 1955 |
| 2,795,435 | Ortiz | June 11, 1957 |
| 2,833,430 | Collins | May 6, 1958 |
| 2,913,131 | Holmes | Nov. 17, 1959 |